(12) United States Patent
Zhou et al.

(10) Patent No.: US 10,260,504 B2
(45) Date of Patent: Apr. 16, 2019

(54) CRANKSHAFT FOR ROTARY COMPRESSOR AND ROTARY COMPRESSOR HAVING SAME

(71) Applicant: GUANGDONG MEIZHI COMPRESSOR CO., LTD., Foshan (CN)

(72) Inventors: Xingbiao Zhou, Foshan (CN); Xinxin Tang, Foshan (CN)

(73) Assignee: GUANGDONG MEIZHI COMPRESSOR CO., LTD., Foshan (CN)

( * ) Notice: Subject to any disclaimer, the term of this patent is extended or adjusted under 35 U.S.C. 154(b) by 61 days.

(21) Appl. No.: 15/502,208

(22) PCT Filed: Jun. 11, 2015

(86) PCT No.: PCT/CN2015/081266
§ 371 (c)(1),
(2) Date: Feb. 7, 2017

(87) PCT Pub. No.: WO2016/197373
PCT Pub. Date: Dec. 15, 2016

(65) Prior Publication Data
US 2017/0227011 A1   Aug. 10, 2017

(51) Int. Cl.
*F04C 29/02* (2006.01)
*F04C 29/00* (2006.01)
(Continued)

(52) U.S. Cl.
CPC ........ *F04C 29/023* (2013.01); *F04C 29/0057* (2013.01); *F16C 3/18* (2013.01); *F04C 18/356* (2013.01); *F04C 2240/603* (2013.01)

(58) Field of Classification Search
CPC ...... F04C 29/023; F04C 29/0057; F04C 3/18; F04C 29/028
See application file for complete search history.

(56) References Cited

U.S. PATENT DOCUMENTS

| | | |
|---|---|---|
| 5,249,941 A | 10/1993 | Shibamoto |
| 5,667,372 A | 9/1997 | Hwang et al. |

(Continued)

FOREIGN PATENT DOCUMENTS

| | | |
|---|---|---|
| CN | 101178092 A | 5/2008 |
| CN | 203130513 U | 8/2013 |

(Continued)

OTHER PUBLICATIONS

Written Opinion issued in the counterpart International Application No. PCT/CN2015/081266, dated Feb. 22, 2016 (3 pages).
(Continued)

*Primary Examiner* — Thomas C Diaz
(74) *Attorney, Agent, or Firm* — Osha Liang LLP

(57) ABSTRACT

A crankshaft for a rotary compressor comprising a body formed with an oil supply passage; and an eccentric portion, fitted over the body, having a central axis eccentrically disposed relative to a central axis of the body, and provided with an oil outlet hole communicated with the oil supply passage and penetrating an outer peripheral wall of the eccentric portion.

17 Claims, 3 Drawing Sheets

(51) Int. Cl.
*F16C 3/18* (2006.01)
*F04C 18/356* (2006.01)

(56) References Cited

U.S. PATENT DOCUMENTS

| | | | | |
|---|---|---|---|---|
| 8,206,139 | B2* | 6/2012 | Hirayama | F04C 18/356 418/11 |
| 9,816,505 | B2* | 11/2017 | Lee | F04C 23/008 |
| 2010/0147020 | A1 | 6/2010 | Hirayama | |

FOREIGN PATENT DOCUMENTS

| | | |
|---|---|---|
| CN | 103511257 A | 1/2014 |
| CN | 103775343 A | 5/2014 |
| CN | 203822638 U | 9/2014 |
| CN | 204729303 U | 10/2015 |
| JP | S55100714 U | 7/1980 |
| JP | H04191494 A | 7/1992 |
| JP | H11247785 A | 9/1999 |
| JP | 2001-73977 A | 3/2001 |
| JP | 3230741 B2 | 11/2001 |
| JP | 2006-52726 A | 2/2006 |
| JP | 2009/287399 A | 12/2009 |
| WO | 2009028632 A1 | 3/2009 |

OTHER PUBLICATIONS

International Search Report issued in the counterpart International Application No. PCT/CN2015/081266, dated Feb. 22, 2016 (6 pages).
Office Action issued in corresponding Chinese Application No. 201510320125.7, dated Jul. 21, 2016 (10 pages).
Office Action issued in corresponding Japanese Application No. 2017-533672 dated Jan. 30, 2018 , and English translation thereof (8 pages).
Extended European Search Report issued in corresponding European Application No. 15894643.4 dated Dec. 17, 2018 (42 pages).

* cited by examiner

CRANKSHAFT FOR ROTARY COMPRESSOR AND ROTARY COMPRESSOR HAVING SAME

CROSS-REFERENCE TO RELATED APPLICATION

The present application is a national phase entry under 35 USC § 371 of International Application PCT/CN2015/081266, filed Jun. 11, 2015, and the entire disclosure of which is incorporated herein by reference.

FIELD

The present disclosure relates to a field of compressors, and more particularly to a crankshaft for a rotary compressor and a rotary compressor having the same.

BACKGROUND

Related technologies indicate that an eccentric portion of a rotary compressor has a cylindrical shape, a piston is fitted over an outer circumferential face of the eccentric portion, and an entire inner circumferential face of the piston is in contact with the entire outer circumferential face of the eccentric portion. When the eccentric portion drives the piston to rotate, a frictional loss occurs, so the eccentric portion is provided with an oil hole to improve lubrication between the eccentric portion and the piston.

However, during operation of the rotary compressor, the piston withstands a gas force due to a pressure differential between high and low pressure sides, and transmits the gas force to the eccentric portion through an oil film between the piston and the eccentric portion. The outer circumferential face of the eccentric portion bears different loads in different regions, and the position of the oil hole affects the oil film distribution and even degrades the bearing capacity of the oil film, resulting in abnormal abrasion. Furthermore, the frictional loss occurs when the eccentric portion drives the piston to rotate, thereby leading to an increase in workload of the rotary compressor.

SUMMARY

Embodiments of the present disclosure seek to solve at least one of the problems existing in the related art to at least some extent. Therefore, the present disclosure provides a crankshaft for a rotary compressor, in which the crankshaft has a long service life.

The present disclosure further provides a rotary compressor having the crankshaft.

According to embodiments of a first aspect of the present disclosure, the crankshaft includes: a body formed with an oil supply passage; and an eccentric portion, fitted over the body, having a central axis eccentrically disposed relative to a central axis of the body, and provided with an oil outlet hole communicated with the oil supply passage and penetrating an outer peripheral wall of the eccentric portion, in which a projection point of the central axis of the body on a reference plane perpendicular to the central axis of the body is denoted as O, a projection point of the central axis of the eccentric portion on the reference plane is denoted as A, an intersection point of a central axis of the oil outlet hole with the outer peripheral wall of the eccentric portion is denoted as B, and an included angle between a connection line BO of the intersection point B and the projection point O and a connection line OA of the projection point O and the projection point A is denoted as θ that satisfies:

$$0 \leq \frac{e}{2 \times R} \times \sin 2\theta + \sin\theta \times \sqrt{1 - \left(\frac{e \times \sin\theta}{R}\right)^2} \leq 1,$$

in which e represents an eccentric distance between the body and the eccentric portion, and R represents a radius of the eccentric portion.

For the crankshaft according to the embodiments of the present disclosure, by providing the included angle θ that satisfies the above relation, when the crankshaft is applied to the rotary compressor, distribution of an oil film between the eccentric portion and the piston fitted over the eccentric portion, and bearing of the oil film will not be affected, thus ensuring the lubrication and bearing between the eccentric portion and the piston and avoiding abnormal abrasion.

According to an embodiment of the present disclosure, an included angle between a connection line BA of the intersection point B and the projection point A and an extension line of the connection line OA of the projection point O and the projection point A is denoted as β, and the included angle β satisfies: 30°≤β≤150°.

According to an embodiment of the present disclosure, a recessed portion is formed in the outer peripheral wall of the eccentric portion.

According to an embodiment of the present disclosure, two ends of the recessed portion in an axial direction of the eccentric portion penetrate end faces of two axial ends of the eccentric portion respectively.

According to an embodiment of the present disclosure, the recessed portion is formed by recessing a part of the outer peripheral wall of the eccentric portion inwards.

According to an embodiment of the present disclosure, the oil outlet hole penetrates the recessed portion.

According to an embodiment of the present disclosure, one or a plurality of recessed portions are provided.

According to embodiments of a second aspect of the present disclosure, the rotary compressor includes the crankshaft for a rotary compressor according to the embodiments of the first aspect of the present disclosure.

Additional aspects and advantages of embodiments of present disclosure will be given in part in the following descriptions, become apparent in part from the following descriptions, or be learned from the practice of embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
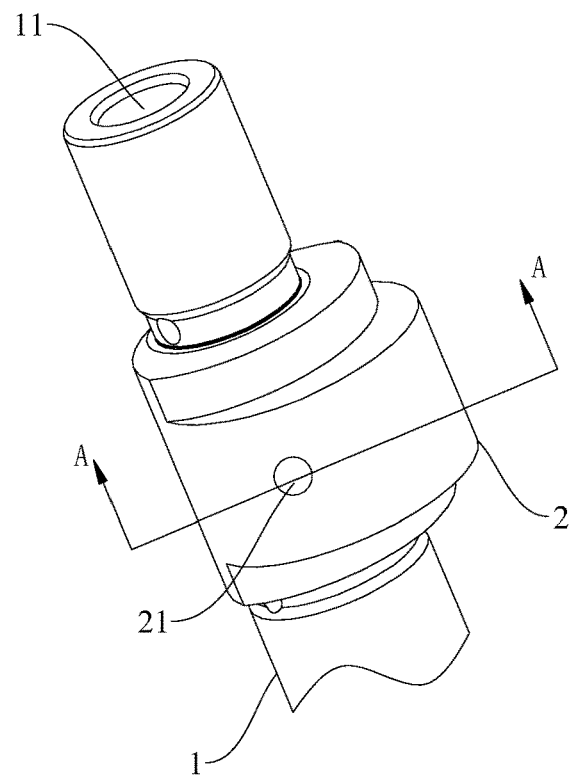
FIG. 1 is a partially perspective view of a crankshaft for a rotary compressor according to an embodiment of the present disclosure.

100: crankshaft;
1: body; 11: oil supply passage;
2: eccentric portion; 21: oil outlet hole; 22: recessed portion.

DETAILED DESCRIPTION

Embodiments of the present disclosure will be described in detail and examples of the embodiments will be illustrated in the drawings, in which same or similar reference numerals are used to indicate same or similar members or members with same or similar functions throughout the specification. The embodiments described herein with reference to drawings are explanatory, which are used to illustrate the present disclosure, but shall not be construed to limit the present disclosure.

In the specification, it is to be understood that terms such as "central," "transverse," "length," "width," "thickness," "upper," "lower," "left," "right," "vertical," "horizontal," "top," "bottom," "inner," "outer," "axial," "radial," and "circumferential" should be construed to refer to the orientation as then described or as shown in the drawings under discussion. These relative terms are for convenience and simplification of description of the present disclosure, and do not alone indicate or imply that the device or element referred to must have a particular orientation, and must be constructed or operated in a particular orientation, thus it should not be construed to a limit to the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

A crankshaft 100 for a rotary compressor according to embodiments of the present disclosure will be described below with reference to FIGS. 1 to 6. The crankshaft 100 may be applied to the rotary compressor, such as a rolling piston type compressor or a swing compressor.

Figure 3:
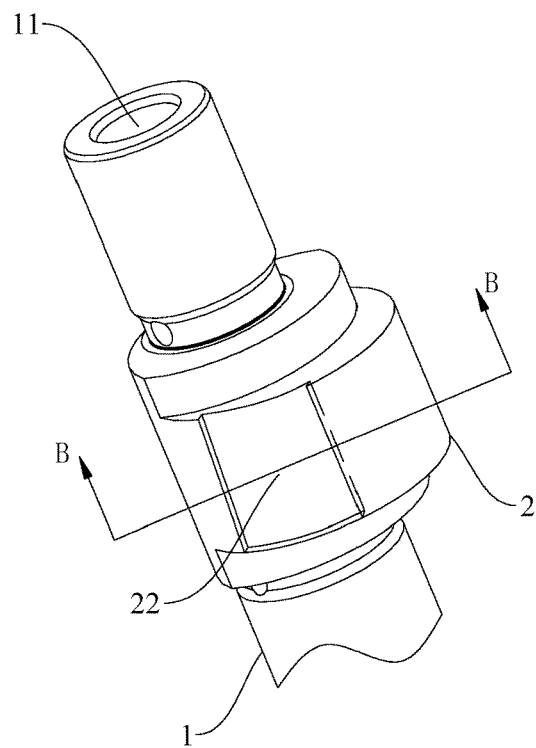
FIG. 3 is a partially perspective view of a crankshaft for a rotary compressor according to another embodiment of the present disclosure.
Figure 5:
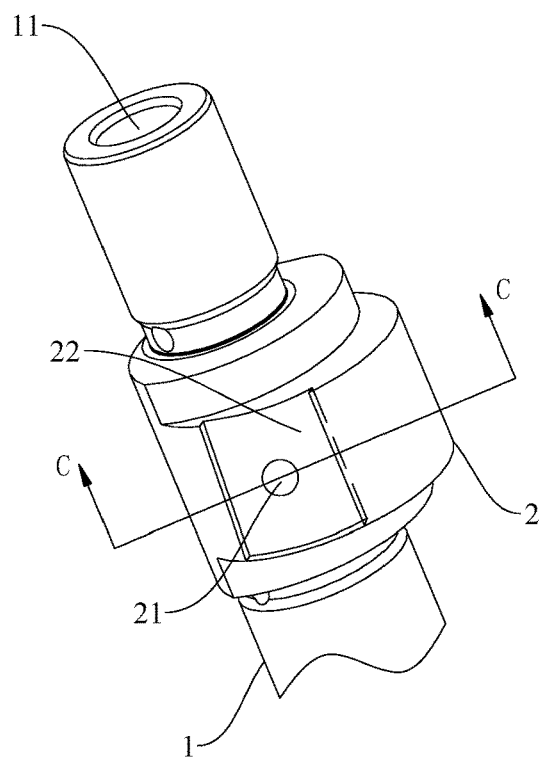
FIG. 5 is a partially perspective view of a crankshaft for a rotary compressor according to another embodiment of the present disclosure.

As shown in FIGS. 1, 3 and 5, the crankshaft 100 according to embodiments of a first aspect of the present disclosure includes a body 1 and an eccentric portion 2.

Specifically, the body 1 is provided with an oil supply passage 11, and for example but not limited thereto, the oil supply passage 11 may extend in an axial direction of the body 1 and penetrates end faces of two axial ends of the body 1. When the crankshaft 100 is applied to the rotary compressor, the oil supply passage 11 may supply lubricant oil in an oil sump of the rotary compressor to various friction pairs within the rotary compressor for lubrication.

The eccentric portion 2 is configured as a cylindrical shape and fitted over the body 1, and a central axis of the eccentric portion 2 is eccentrically disposed relative to a central axis of the body 1, i.e. the central axis of the eccentric portion 2 is spaced apart from the central axis of the body 1 in a cross section of the crankshaft 100. In an embodiment, the eccentric portion 2 and the body 1 are integrally molded.

The eccentric portion 2 is formed with an oil outlet hole 21 communicated with the oil supply passage 11 and penetrating an outer peripheral wall of the eccentric portion 2. For example, referring to FIGS. 2, 4 and 6, an inner end of the oil outlet hole 21 is in communication with the oil supply passage 11, and an outer end thereof penetrates the peripheral wall of the eccentric portion 2, such that the lubricant oil in the oil supply passage may enter between the eccentric portion 2 and a piston fitted over the eccentric portion 2 through the oil outlet hole 21, so as to improve lubrication between the eccentric portion 2 and the piston and reduce a frictional loss. It should be noted herein that an "inward" direction may be interpreted as a direction facing a center of the body 1, while its opposite direction is defined as "outward", i.e. a direction away from the center of the body 1.

Figure 2:
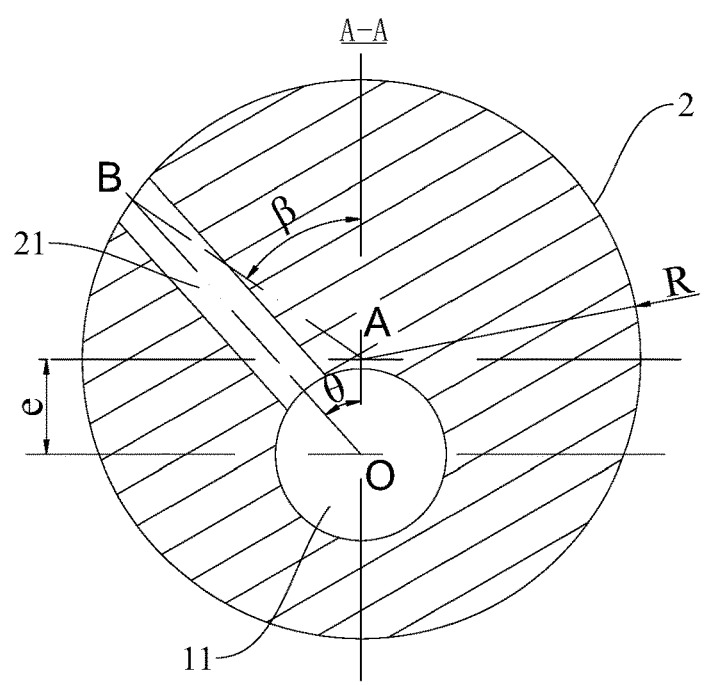
FIG. 2 is a sectional view along line A-A in FIG. 1.

As shown in FIG. 2, a projection point of the central axis of the body 1 on a reference plane perpendicular to the central axis of the body 1 is denoted as O, a projection point of the central axis of the eccentric portion 2 on the above reference plane is denoted as A, an intersection point of a central axis of the oil outlet hole 21 with the outer peripheral wall of the eccentric portion 2 is denoted as B, and an included angle between a connection line BO of the intersection point B and the projection point O and a connection line OA of the projection point 0 and the projection point A is denoted as θ that satisfies:

$$0 \le \frac{e}{2 \times R} \times \sin 2\theta + \sin\theta \times \sqrt{1 - \left(\frac{e \times \sin\theta}{R}\right)^2} \le 1,$$

in which e represents an eccentric distance between the body 1 and the eccentric portion 2, and R represents a radius of the eccentric portion 2. Thus, by making θ satisfies the above relation, it is possible to ensure effective lubrication and bearing of the piston and the eccentric portion 2.

For the crankshaft 100 for the rotary compressor according to the embodiments of the present disclosure, by providing the included angle θ that satisfies the above relation, when the crankshaft 100 is applied to the rotary compressor, distribution of an oil film between the eccentric portion 2 and the piston fitted over the eccentric portion 2, and bearing of the oil film will not be affected, thus ensuring the lubrication and bearing between the eccentric portion 2 and the piston and avoiding abnormal abrasion, so as to improve a service life of the crankshaft 100.

According to a further embodiment of the present disclosure, as shown in FIG. 2, an included angle between a connection line BA of the intersection point B and the projection point A and an extension line of the connection line OA of the projection point O and the projection point A is denoted as β, and the included angle β may be provided to satisfy: 30°≤β≤150°, so as to better ensure the lubrication between the eccentric portion 2 and the piston.

Therefore, an effective bearing region where the outer peripheral wall of the eccentric portion 2 bears a load will not be damaged due to a relatively small pressure at the oil outlet hole 21. For example, the oil film of a part of the outer peripheral wall of the eccentric portion 2, which is located at a distance from the center axis of the body 1, is retained, to prevent the PV value from becoming too large, and hence to reduce workload of the rotary compressor effectively.

Figure 4:
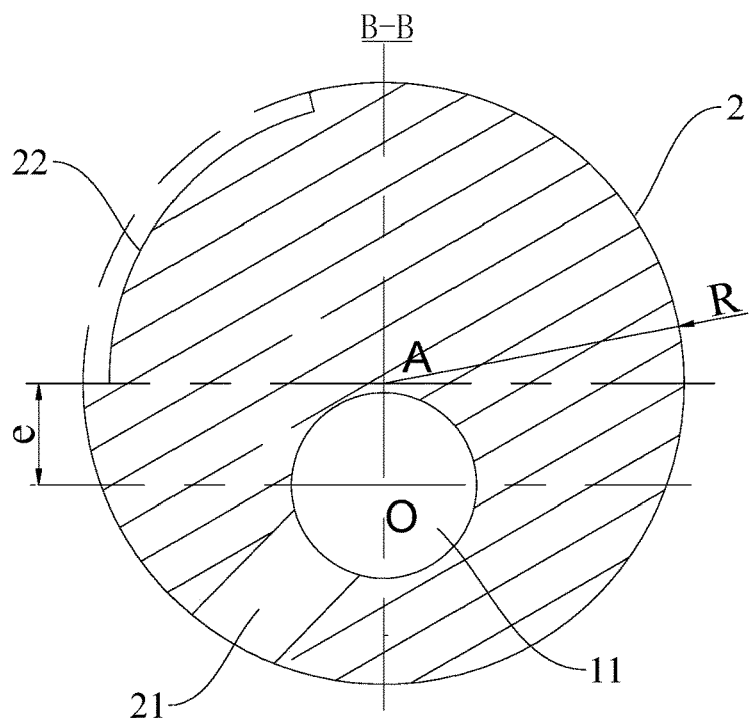
FIG. 4 is a sectional view along line B-B in FIG. 3.

According to an optional embodiment of the present disclosure, an recessed portion 22 is formed in the outer peripheral wall of the eccentric portion 2; referring to FIG. 3 in combination with FIG. 4, the recessed portion 22 may be formed by recessing a part of the outer peripheral wall of the eccentric portion 2 inwards; and the recessed portion 22 has a corresponding central angle smaller than 360°. Therefore, by providing the recessed portion 22, it is possible to reduce a contact area between the outer peripheral wall of the eccentric portion 2 and an inner peripheral wall of the piston effectively, thereby effectively reducing the friction between the two and reducing the load and noise during operation of the rotary compressor, so as to improve energy efficiency of the rotary compressor.

In an example of FIGS. 3 and 4, one recessed portion 22 is provided, and two ends of the recessed portion 22 in an axial direction of the eccentric portion 2 penetrate end faces of two axial ends of the eccentric portion 2 respectively, which facilitates machining, and further reduces the contact area between the outer peripheral wall of the eccentric portion 2 and the inner peripheral wall of the piston.

Certainly, in other examples of the present disclosure, a plurality of recessed portions 22 may be provided (not illustrated), and the plurality of recessed portions 22 may be disposed spaced apart from one another in a peripheral direction of the eccentric portion 2, or in the axial direction of the eccentric portion 2, or both in the peripheral direction and in the axial direction of the eccentric portion 2. It can be understood that arrangement of the recessed portions 22 in the eccentric portion 2 may be provided in the light of practical requirements, which will not be defined particularly in the present disclosure.

The recessed portion 22 may be integrally formed by casting, or may be formed by performing a milling process on a predetermined region of the outer peripheral wall of the eccentric portion 2.

Figure 6:
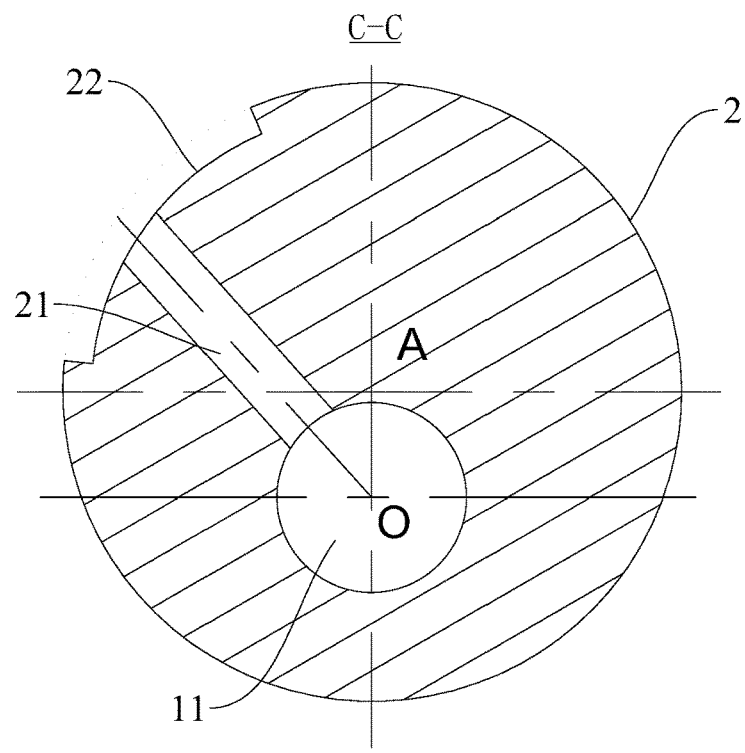
FIG. 6 is a sectional view along line C-C in FIG. 5.

Referring to FIG. 5 in combination with FIG. 6, the oil outlet hole 21 penetrates the recessed portion 22, and specifically the outer end of the oil outlet hole 21 penetrates an inner wall of the recessed portion 22. Therefore, it is possible to prevent the PV value from becoming too large, thereby reducing the workload of the rotary compressor effectively, and increase an oil circulation area, thereby ensuring the lubrication between the eccentric portion 2 and the piston better.

The crankshaft 100 according to the embodiments of the present disclosure has advantages of simple technology, convenient machining and effective reduction in the cost.

A rotary compressor according to embodiments of a second aspect of the present disclosure includes the crankshaft 100 for the rotary compressor according to the embodiments of the first aspect of the present disclosure.

Other components (like an electric motor) and operations of the rotary compressor according to the embodiments of the present disclosure are known to those skilled in the art, and hence will not be elaborated herein.

Reference throughout this specification to "an embodiment," "some embodiments," "exemplary embodiment", "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, modifications, alternatives and variants can be made in the embodiments without departing from principles and scope of the present disclosure. The scope of the present disclosure is defined by claims and the like.

What is claimed is:

1. A crankshaft for a rotary compressor, comprising:
   a crankshaft body formed with an oil supply passage; and
   an eccentric portion, fitted over the crankshaft body, having a central axis eccentrically disposed relative to a central axis of the crankshaft body, and provided with an oil outlet hole communicated with the oil supply passage and penetrating an outer peripheral wall of the eccentric portion,
   wherein a projection point of the central axis of the crankshaft body on a reference plane perpendicular to the central axis of the crankshaft body is denoted as O, a projection point of the central axis of the eccentric portion on the reference plane is denoted as A, an intersection point of a central axis of the oil outlet hole with the outer peripheral wall of the eccentric portion is denoted as B, and an included angle between a connection line BO of the intersection point B and the projection point O and a connection line OA of the projection point O and the projection point A is denoted as θ that satisfies:

$$0 \le \frac{e}{2 \times R} \times \sin 2\theta + \sin\theta \times \sqrt{1 - \left(\frac{e \times \sin\theta}{R}\right)^2} \le 1$$

in which e represents an eccentric distance between the central axis of the crankshaft body and the central axis of the eccentric portion, and R represents a radius of the eccentric portion.

2. The crankshaft according to claim 1, wherein an included angle between a connection line BA of the intersection point B and the projection point A and an extension line of the connection line OA of the projection point O and the projection point A is denoted as β, and the included angle β satisfies: 30°≤β≤150°.

3. The crankshaft according to claim 1, wherein a recessed portion is formed in the outer peripheral wall of the eccentric portion.

4. The crankshaft according to claim 3, wherein two ends of the recessed portion in an axial direction of the eccentric portion penetrate end faces of two axial ends of the eccentric portion respectively.

5. The crankshaft according to claim 3, wherein the recessed portion is formed by recessing a part of the outer peripheral wall of the eccentric portion inwards.

6. The crankshaft according to claim 3, wherein the oil outlet hole penetrates the recessed portion.

7. The crankshaft according to claim 3, wherein one or a plurality of recessed portions are provided.

8. A rotary compressor, comprising a crankshaft for a rotary compressor comprising:
   a body formed with an oil supply passage; and
   an eccentric portion, fitted over the body, having a central axis eccentrically disposed relative to a central axis of the body, and provided with an oil outlet hole communicated with the oil supply passage and penetrating an outer peripheral wall of the eccentric portion, wherein a projection point of the central axis of the body on a reference plane perpendicular to the central axis of the body is denoted as O, a projection point of the central axis of the eccentric portion on the reference plane is denoted as A, an intersection point of a central axis of the oil outlet hole with the outer peripheral wall of the eccentric portion is denoted as B, and an included angle between a connection line BO of the intersection point B and the projection point O and a connection line OA of the projection point O and the projection point A is denoted as θ that satisfies:

$$0 \le \frac{e}{2 \times R} \times \sin 2\theta + \sin\theta \times \sqrt{1 - \left(\frac{e \times \sin\theta}{R}\right)^2} \le 1$$

in which e represents an eccentric distance between the central axis of the body and the central axis of the eccentric portion, and R represents a radius of the eccentric portion.

9. The rotary compressor according to claim 8, wherein an included angle between a connection line BA of the intersection point B and the projection point A and an extension line of the connection line OA of the projection point O and the projection point A is denoted as β, and the included angle β satisfies: 30°≤β≤150°.

10. The rotary compressor according to claim 8, wherein a recessed portion is formed in the outer peripheral wall of the eccentric portion.

11. The rotary compressor according to claim 9, wherein a recessed portion is formed in the outer peripheral wall of the eccentric portion.

12. The rotary compressor according to claim 10, wherein two ends of the recessed portion in an axial direction of the eccentric portion penetrate end faces of two axial ends of the eccentric portion respectively.

13. The rotary compressor according to claim 10, wherein the recessed portion is formed by recessing a part of the outer peripheral wall of the eccentric portion inwards.

14. The rotary compressor according to claim 10, wherein the oil outlet hole penetrates the recessed portion.

15. The rotary compressor according to claim 10, wherein one or a plurality of recessed portions are provided.

16. The crankshaft according to claim 2, wherein a recessed portion is formed in the outer peripheral wall of the eccentric portion.

17. A crankshaft for a rotary compressor, comprising:
a crankshaft body formed with an oil supply passage; and
an eccentric portion, fitted over the crankshaft body, having a central axis eccentrically disposed relative to a central axis of the crankshaft body, and provided with an oil outlet hole communicated with the oil supply passage and penetrating an outer peripheral wall of the eccentric portion, a recessed portion being formed in the outer peripheral wall of the eccentric portion, two ends of the recessed portion in an axial direction of the eccentric portion penetrating end faces of two axial ends of the eccentric portion respectively, and the oil outlet hole penetrating the recessed portion, wherein a projection point of the central axis of the crankshaft body on a reference plane perpendicular to the central axis of the crankshaft body is denoted as O, a projection point of the central axis of the eccentric portion on the reference plane is denoted as A, an intersection point of a central axis of the oil outlet hole with the outer peripheral wall of the eccentric portion is denoted as B, and an included angle between a connection line BO of the intersection point B and the projection point O and a connection line OA of the projection point O and the projection point A is denoted as θ that satisfies:

$$0 \le \frac{e}{2 \times R} \times \sin 2\theta + \sin\theta \times \sqrt{1 - \left(\frac{e \times \sin\theta}{R}\right)^2} \le 1$$

in which e represents an eccentric distance between the central axis of the crankshaft body and the central axis of the eccentric portion, and R represents a radius of the eccentric portion.

* * * * *